UNITED STATES PATENT OFFICE.

ARIE H. KLAASSEN AND PIERRE S. BOUWER, OF GRAND RAPIDS, MICHIGAN.

WOOD-FINISHING COMPOSITION.

1,279,878.     Specification of Letters Patent.     Patented Sept. 24, 1918.

No Drawing.     Application filed April 30, 1918. Serial No. 231,714.

*To all whom it may concern:*

Be it known that we, ARIE H. KLAASSEN and PIERRE S. BOUWER, subjects of the Queen of the Netherlands, residing at Grand Rapids, in the county of Kent and State of Michigan, have invented new and useful Improvements in Wood-Finishing Compositions, of which the following is a specification.

The present invention relates to wood-finishing compositions; and its object is to provide an improved composition of matter adapted to be applied to wood in order to preserve the same and impart thereto an ornamental finish.

We make our composition of the following materials and in the following manner:

We thoroughly mix and boil together for a short time in a closed vessel in order to confine the fumes, ten parts in volume of spirits of ammonia and two parts in volume of powdered china clay. We thoroughly mix and boil together for a short time a quarter of a like part in volume of beeswax and a half of a like part in volume of turpentine.

We then thoroughly mix these ingredients and boil the whole together in a closed vessel for about four to six hours. Any suitable coloring matter may be incorporated to impart the desired tint; and water, amounting to as much as one-fourth part in volume of the composition may be added to thin the composition as desired.

The composition may be applied to the wood with a brush. When dry, the surface may be brushed with a stiff brush or rubbed with a cloth. This composition fills the pores of the wood and imparts a finish to its surface, only one coat or application being necessary.

We claim:

1. A wood finishing composition made by boiling spirits of ammonia and powdered china clay together in a closed vessel; boiling beeswax and turpentine together; and then boiling the mass in a closed vessel.

2. A wood finishing composition made by boiling ten parts in volume of spirits of ammonia and two parts in volume of powdered china clay together in a closed vessel; boiling one-fourth of one like part of beeswax and one-half of one like part of turpentine together; and then boiling the mass in a closed vessel.

3. A wood finishing composition made by boiling ten parts in volume of spirits of ammonia and two parts in volume of powdered china clay together in a closed vessel; boiling one-fourth of one like part of beeswax and one-half of one like part of turpentine together; and then boiling the mass in a closed vessel for from four to six hours.

4. A wood finishing composition made by boiling spirits of ammonia and powdered china clay together in a closed vessel; boiling beeswax and turpentine together; and then boiling the mass in a closed vessel; and adding water to the mass.

5. A wood finishing composition made by boiling spirits of ammonia and powdered china clay together in a closed vessel; boiling beeswax and turpentine together; and then boiling the mass in a closed vessel; and incorporating coloring material in the mass.

In testimony whereof we have hereunto set our hands at Grand Rapids, Michigan, this 27th day of April, 1918.

ARIE H. KLAASSEN.
             PIERRE S. BOUWER.

Copies of this patent may be obtained for five cents each, by addressing the "Commissioner of Patents, Washington, D. C."